Aug. 20, 1940.   M. CONSTANT   2,212,467
APPARATUS FOR SEPARATING MINERALS
Filed Feb. 17, 1939   5 Sheets-Sheet 5
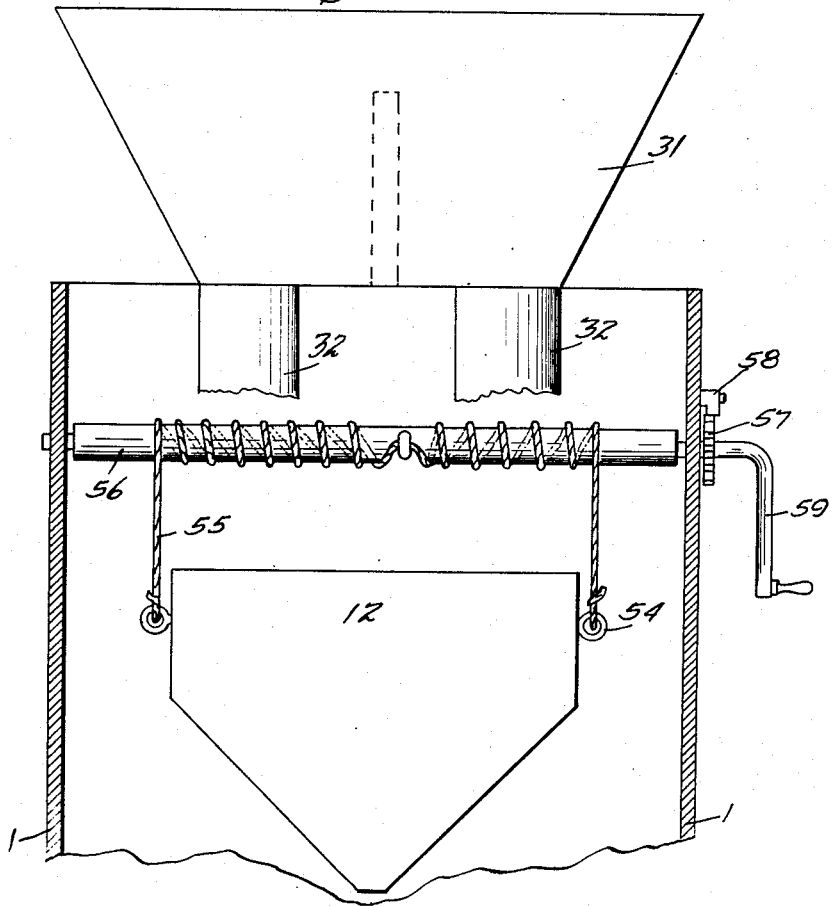
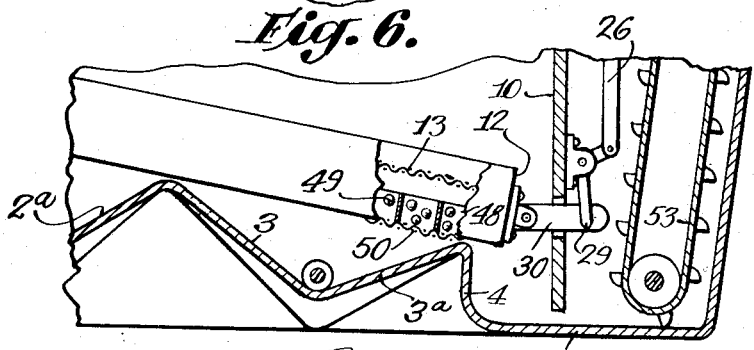

Patented Aug. 20, 1940

2,212,467

UNITED STATES PATENT OFFICE 2,212,467

APPARATUS FOR SEPARATING MINERALS

Maurice Constant, Scobey, Mont.

Application February 17, 1939, Serial No. 256,969

8 Claims. (Cl. 209—454)

My invention relates to improvements in machinery for separating gold or other precious metals from placer material, ground ore, pulp, slimes, and other liquid mixtures.

The objects of my invention are to provide improved means to recover flour gold and other extremely fine metal particles which by reason of their fineness or on account of being greasy or coated with some foreign material are difficult to recover by the ordinary sluices, tables, jigs, and other machines now in common use, as well as to provide improved means for extracting both the buoyant and non-buoyant particles of gold or such other minerals.

While my apparatus is particularly designed for use upon placer ground containing valuable quantites of gold, includng flour gold or other fine metals which by reason of fineness or because of their chemical composition or by reason of being coated with some extraneous substances are likely to remain in the liquid and be carried off in the tailings rather than be recovered by precipitation, it is not limited to any particular class of material.

I accomplish these objects by the means illustrated in the accompanying drawings, in which—

Figure 5 is an alternate form for adjustable suspension of the rifflebox.

Figure 6 is an enlarged detail to show more clearly the form of the balls 49 and the relation of the lower end of the box or trough 12 to the bin formed by the bottom plates 3 and 3a and the tailings discharge chamber.

Similar numerals refer to similar parts throughout the several views.

My apparatus comprises a tank which may be of either wood or metal. A convenient size for the tank is to have a width of three feet and a length and height of approximately ten feet, but these dimensions are not intended to be critical but are subject to a wide range of variation for greater or less capacity and to adapt them to various slimes and liquid mixtures of ore and water.

The greater the fineness of the mineral and difficulty of extraction, the greater the depth of water that will be required and the greater length of time to be given to its treatment.

Figure 1:
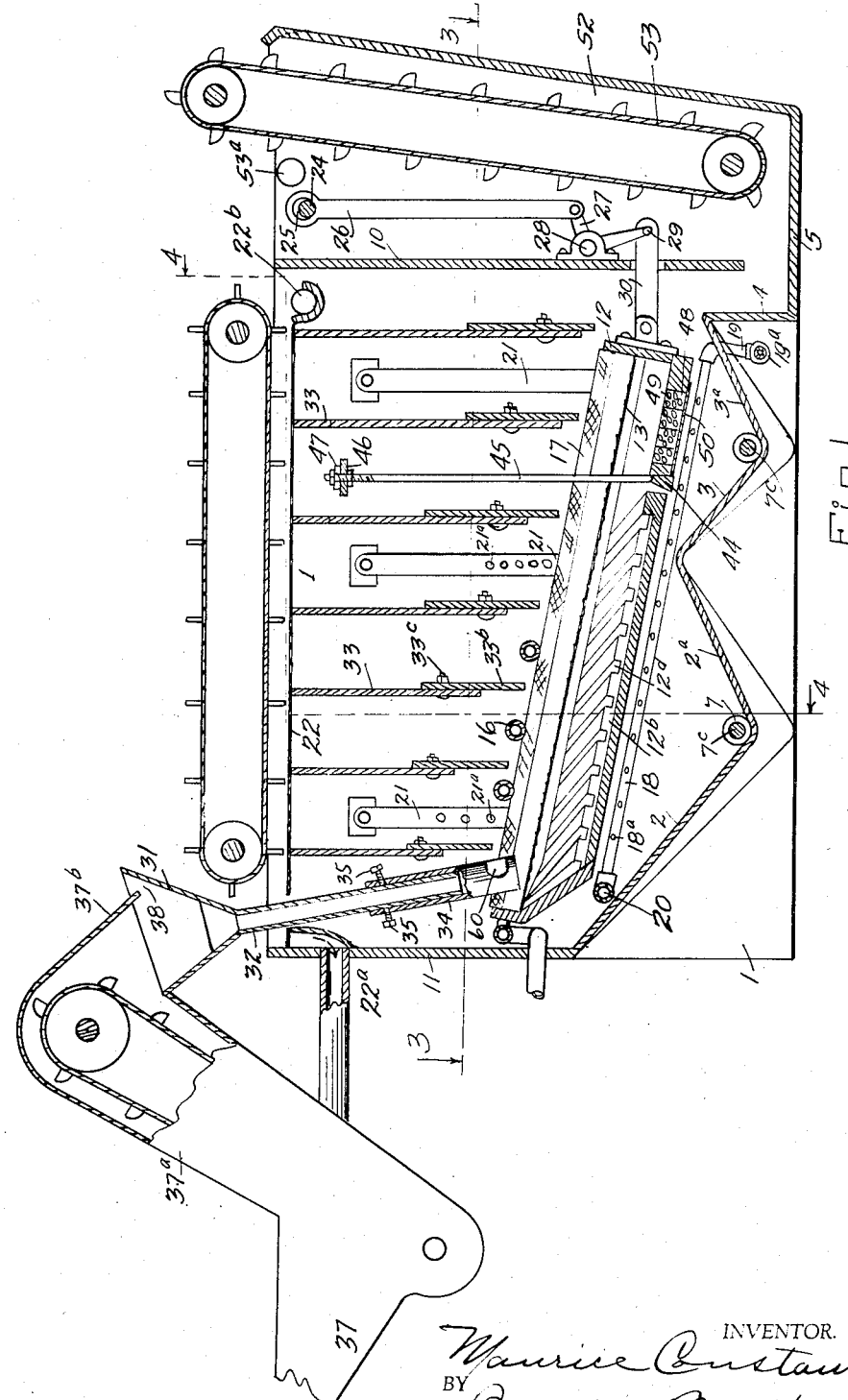
Figure 1 is a longitudinal sectional elevation of my apparatus on the middle line.
Figure 2:
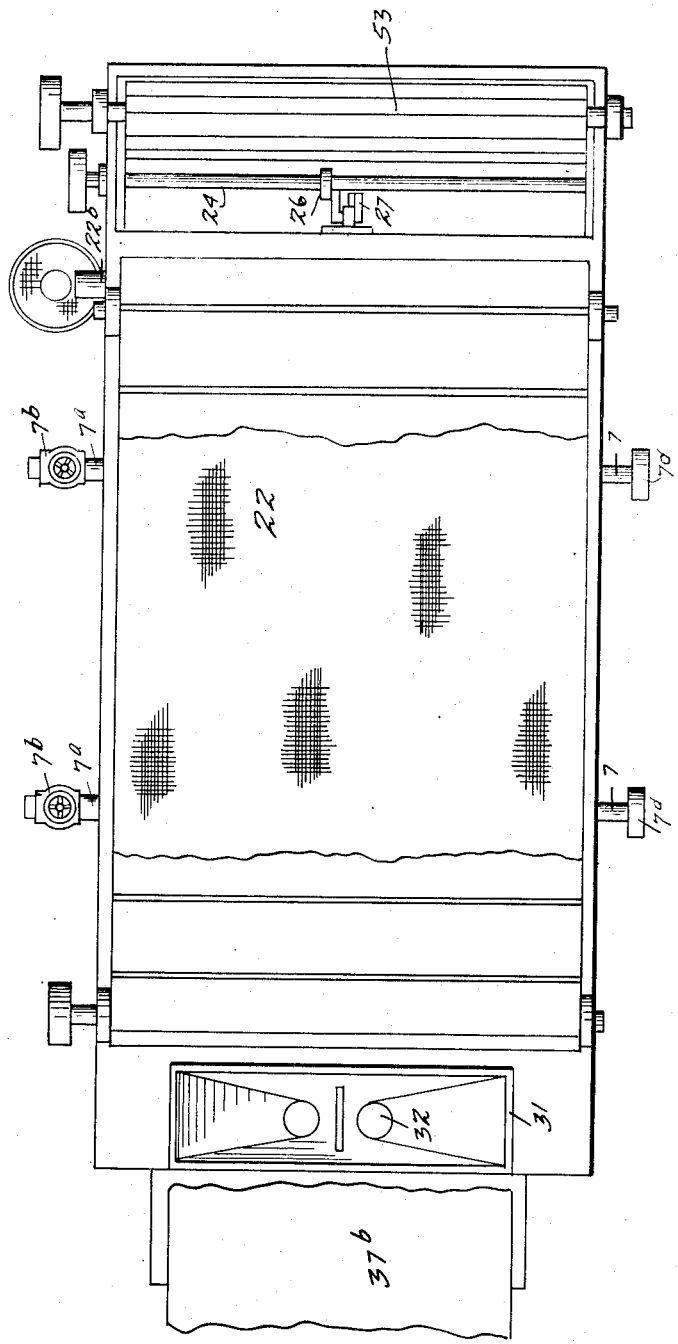
Figure 2 is a top or plan view with a part of the rake broken away.
Figure 3:
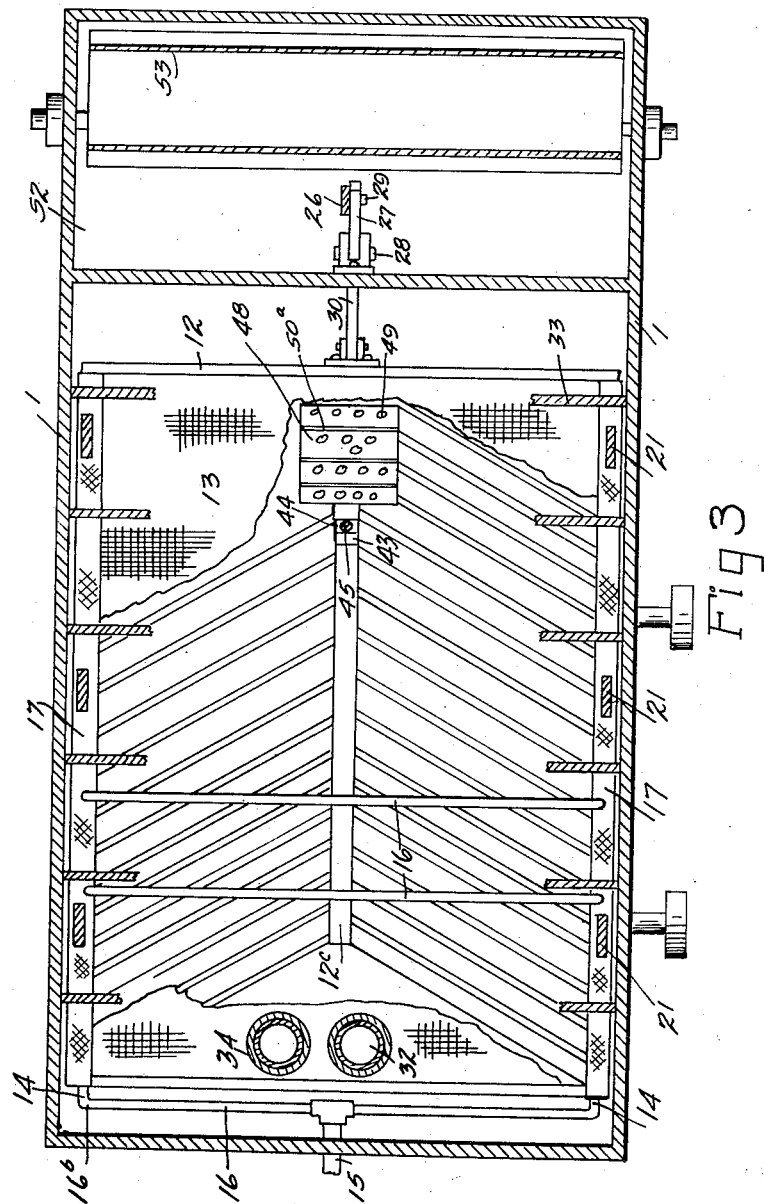
Figure 3 is a horizontal section on the line 3—3 of Figure 1 with parts of the screen in the rifflebox broken away.
Figure 4:
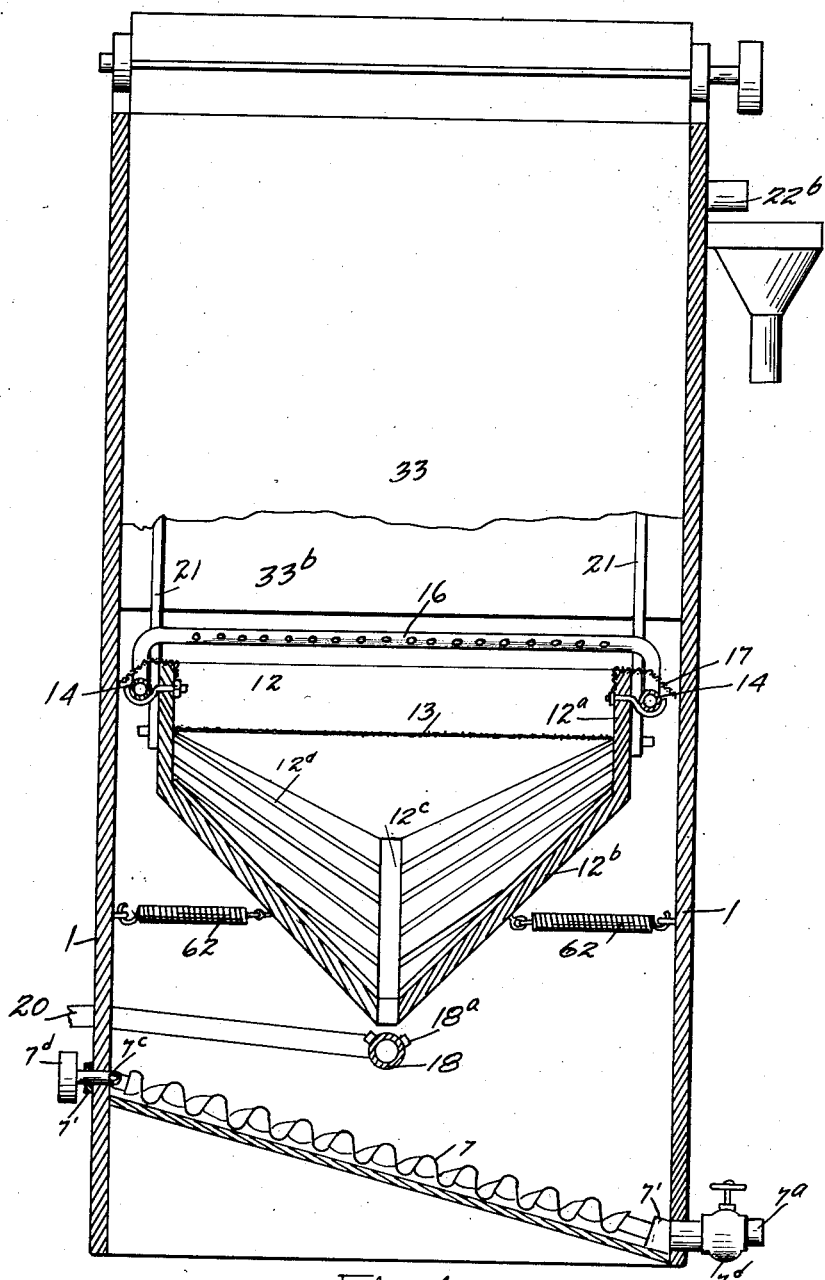
Figure 4 is a rear elevation partly in section on the line 4—4 of Figure 1.

For convenience I refer to the left or feed end of the tank as shown in Figure 1 as the front and to the right or discharge end for the tailings, as the rear end.

The tank is comprised of side plates 1 with rear end plate 10 and front end plate 11, and with bottom plates 2, 2a, 3, 3a, 4 and 5 united to the side plates by riveting, welding or other suitable means.

The bottom plates 2, 2a, 3 and 3a are preferably secured at angles of approximately 45° to the horizontal longitudinal line and may be either level or sloped at a moderate angle from one side to the other. The lower junctions of the plates 2 and 2a and the plates 3 and 3a are preferably rounded and a conveyor is mounted in each having a shaft 7c with flights 7 united thereto. The shaft 7c is preferably mounted in wooden blocks 7' or other suitable bearing blocks united to the sides 1 of the tank and one end of the shaft 7c extends out through the side 1 and is provided with a drive pulley 7d by which the conveyor may be revolved.

The extension of the shaft 7c may be made flexible or formed with a universal joint to adjust itself to the angle, if necessary. At the lower end of the curved portion described, an outlet pipe, 7a is secured in the side of the tank 1 with a valve 7b which may be opened to the full size of the pipe 7a to draw off any accumulations of black sand or other material on the bottom of the tank.

Within the tank I mount a box or trough 12 having sides 12a and bottom boards 12b extending lengthwise thereof. The side boards extend the entire length of the box, but the front ends thereof are sloped upwardly and the bottom boards at the upper end are sloped to correspond. This brings the front end of the box to a very narrow compass so as to allow same to pass through the water in its vibratory movement hereafter described, freely and without causing much surging of the adjacent water in the tank.

The bottom of the box slopes downwardly from the sides to the middle preferably at an angle of approximately 45°. In the middle of the bottom a longitudinal groove 12c is cut which I prefer to form about three-fourths of an inch in depth. Lateral grooves 12d approximately half an inch in depth are formed in the bottom boards extending from the outer edges of those boards rearwardly and downwardly to the center groove just described. I prefer to place the lateral grooves at an acute angle to the central groove.

In the box 12 I mount a screen 13 just above the upper edges of the bottom boards and the screen may be united to the side boards 12a by any suitable means. The sides 12a preferably extend upwardly from the bottom boards approximately six inches, but these dimensions may be varied as desired.

The box 12 is suspended in the tank by a plurality of links or hangers 21 the upper ends of which are pivotally mounted on the sides 1 of the tank on the inside, and the lower ends of which are pivotally united to the side boards 12a of the box 12 so that the box is free to vibrate longitudinally of the tank.

The front and intermediate hangers or links are provided with a plurality of openings 21a adapted to receive the pivots which unite them to the box so that the front end of the box may be raised or lowered to any desired adjusted height and the pitch of the box be thereby increased or decreased.

In order to conduct the pulp into the tank, I provide a hopper 31 close to the front end of the tank, having a plurality of outlet pipes 32 which extend from the hopper down to the front end of the box. These pipes are preferably formed with removable sections 34 at their lower ends secured to the pipes 32 by set screws 35 so that when it is desired to raise the upper end of the box, the movable sections may be raised to permit change in the elevation of that end of the box.

The pulp or feed may be conducted to the hopper 31 by any desired means, but I prefer to provide a bin 37 at the front end of the tank with an elevator housing 37a united thereto containing an elevator of the chain and cup or cup and belt type. The elevator housing 37a is provided with an apron 37b to prevent the pulp splashing out and this apron is preferably set back from the rear edge of the hopper 31 so as to leave an opening 38 through which air may freely enter the hopper 31.

As the pulp or feed is thrown into the hopper 31 by the elevator it causes considerable splashing and the pulp or feed will pick up considerable quantities of air and carry it down through the tubes 32 where it is liberated with the rest of the pulp and may rise upwardly in the tank as the pulp progresses downwardly through the box or trough 12.

Along the course of the box 12 I mount inside of the tank transverse baffle plates or partitions 33. Each partition 33 is composed of a fixed plate which is united to the sides 1 of the tank by bolts, rivets, or other suitable means and an adjustable plate 33b the upper end of which may be united to the fixed plate by bolts 33c or other suitable means.

The plates 33 and 33b may be provided with a plurality of openings in which the bolts 33c will fit so that the plates 33b can be raised or lowered and bolted in any desired adjusted position. The lower edges of the plates 33b are maintained a very short distance above the top of the adjacent sides of the box 12. The rear end plate 10 extends past the lower end of the box 12 and down to within a few inches of the bottom plate 5 so as to prevent any resurgence of water or pulp from the discharge elevator.

Above the bottom plate 5 I form a discharge chamber 52 in which I mount an elevator 53 which may be of the cup and belt or cup and chain or other suitable type, to carry off the tailings from the lower end of the chamber 52 and in the upper end of the chamber 52 I provide an overflow outlet 53a which is slightly above the desired water level for the tank.

At the front end of the tank I provide an outlet pipe 22a approximately at the water level leading back into the bin 37 to conduct any slimes that may accumulate at that part of the tank back to the bin 37 from which they will be carried upwardly by the elevator and again fed to the tank.

The baffles or partitions 33 extend upwardly to just below the desired water level and a screen 22 having approximately a quarter inch mesh extends across the entire width of the tank with a movable raking mechanism mounted above the screen to rake off the buoyant or floatable particles that may accumulate on the top of the body of water in the tank and to conduct them to the outlet 22b from which they may be recovered by screening, filtering or other suitable means.

Near the lower end of the box I make a cut or opening 43 which extends through the bottom boards and is preferably two inches long, transversely of the box and half an inch wide longitudinally of the box. This cut or opening 43 is formed with straight sides and a wedge-shaped block 44 is provided and adjustably mounted in the opening 43. A rod 45 has its lower end united to the block 44 and its upper end is secured by nuts 47 to a crossbar 46 which extends transversely of the tank slightly below the water level. The rod 45 may be pulled upwardly by adjusting the nuts 47 so as to close or reduce the size of the passage through the opening 43 or the size of the opening may be increased by adjusting the nuts so as to lower the block 44.

In material producing a large quantity of black sand or black mineral particles, a larger opening will be required than for material producing less thereof.

In the middle of the bottom of the box just below the opening 43 I form a pocket 48 approximately a foot long which extends through the bottom boards. The bottom of this pocket is closed by a screen 50 and the pocket is preferably filled with steel balls 49 approximately three-eighths of an inch in diameter which act to catch any particles of subsidable gold or metal or black sand or other values which have escaped the opening 43.

In order to keep the balls 49 from becoming displaced, I insert in the pocket a plurality of screens 50a extending transversely from one side to the other of the pocket 48 and of a height corresponding to the thickness of the bottom boards 12b of the box. The lower end of the box or trough extends rearwardly far enough beyond the screen 50 and pocket 48 so as to lead the waste material into the discharge chamber and slightly to the rear of the bottom plate 3a as shown more clearly in Figure 6.

In order to facilitate the separating action through the screen 13 I mount a shaft 24 in the discharge chamber carrying an eccentric 25 united to an eccentric rod 26 the lower end of which is pivoted to one arm of a bell-crank lever 27 pivoted upon the end of the tank upon a pivot 28. The other arm of the bell-crank lever carries a pivot 29 uniting it to one end of a link 30 the opposite end of which is pivoted to the box 12 so that as the shaft 24 revolves, the eccentric 25 carries the rod 26 up and down thus actuating the bell-crank lever 27 and vibrating the box 12 longitudinally. A relatively small vibration of two inches is sufficient for most purposes, but the said conveyor and likewise any particles which settle into the trough of the upper conveyor are carried off in a similar manner.

Any buoyant particles receive some assistance in rising from the air pipes 14 and 16 and the upwardly moving current of water from the water pipe 18. As the buoyant material rises to the surface, it passes through the screen 22 and is carried by the rake 23 to the discharge opening 22ã from which it may be recovered by the filter 22c. The waste material is carried off by the discharge elevator and the operation of this apparatus may be practically continuous.

It is obvious that various changes may be made in the form and proportions of the various parts without departing from the spirit of my invention and I do not limit my claims to the precise forms shown in the drawings.

I claim:

1. A machine to recover fine particles of gold, silver, platinum, lead or other metals from an aqueous mineral-bearing pulp or slime, comprising a tank relatively long and narrow and containing a large body of aqueous liquid with outlet means to maintain a constant high level of liquid therein, an inclined, submerged rifflebox mounted in the tank, intake means united to the tank adapted to conduct streams of pregnant solution to the upper end of the rifflebox, the upper end of said rifflebox being submerged to a depth of from two to six feet below the fluid level of the tank, discharge means adapted to carry off separately from the lower end of the trough the barren solution after the values have been separated therefrom, a compressed air supply pipe mounted along the rifflebox with ports therein to supply air to the liquid and facilitate the flotation of the buoyant particles of metal, a horizontal screen mounted in the tank slightly below the fluid level permitting the passage of buoyant particles of mineral ascending in the solution, a rake to rake off the float from the screen, and separate discharge means to carry off and filter such float.

2. A machine to recover fine particles of gold, silver, platinum, lead or other metals from an aqueous mineral-bearing pulp or slime, comprising a tank relatively long and narrow and containing a large body of aqueous liquid with outlet means to maintain a constant high level of liquid therein, an inclined, submerged rifflebox mounted in the tank, intake means united to the tank adapted to conduct streams of pregnant solution to the upper end of the rifflebox, the upper end of said rifflebox being submerged to a depth of from two to six feet below the fluid level of the tank, discharge means adapted to carry off separately from the lower end of the trough the barren solution after the values have been separated therefrom, compressed air supply pipes mounted alongside the rifflebox on opposite sides with ports therein to supply air to the liquid and facilitate the flotation of the buoyant particles of metal, a horizontal screen mounted in the tank slightly below the fluid level permitting the passage of buoyant particles of mineral ascending in the solution, a rake to rake off the float from the screen, and separate discharge means to carry off and filter such float.

3. A machine as described in claim 2, said intake means comprising a hopper mounted on the tank with pipes leading therefrom into the higher end of the rifflebox.

4. A machine as described in claim 2, said intake means comprising a hopper mounted on the tank with pipes leading therefrom into the higher end of the rifflebox, and a bucket type elevator to carry the pulp to the hopper and to discharge the pulp into the hopper intermittently in successive charges so as to impound air in and between the charges and whereby the air is carried downwardly into the rifflebox and there released to rise in bubbles through the liquid and facilitate the separation of the buoyant particles.

5. A machine as described in claim 2, and a plurality of stationary transverse baffles or partitions mounted in the tank extending from side to side slightly above the rifflebox and below the horizontal screen.

6. A machine as described in claim 2, and a plurality of stationary transverse baffles or partitions mounted in the tank extending from side to side slightly above the rifflebox and below the horizontal screen, each of said baffles comprising a fixed plate and an adjustable plate with means for securing the adjustable plate at various heights upon the fixed plate.

7. In a machine to recover fine particles of gold, silver, platinum, lead or other metals from an aqueous mineral-bearing pulp or slime, the combination with a relatively long and narrow tank containing a large body of aqueous liquid with outlet means to maintain a constant high level of liquid therein, of an adjustable, inclined submerged rifflebox mounted in the tank having means to adjust the height of the feed end thereof, intake means united to the tank adapted to conduct streams of pregnant solution to the upper end of the rifflebox, the upper end of said rifflebox being submerged to a depth of from two to six feet below the fluid level of the tank, discharge means adapted to carry off separately from the lower end of the rifflebox the barren solution after the values have been separated therefrom, means for forcing compressed air into the liquid below and along the rifflebox, a horizontal screen mounted in the tank slightly below the fluid level permitting the passage of buoyant particles of mineral ascending in the solution, a rake to rake off the float from the screen, and separate discharge means to carry off and filter such float.

8. In a machine for recovering fine gold and other metals, the combination as set out in claim 7, the bottom of the rifflebox being V-shaped in section.

MAURICE CONSTANT.

length of the vibration may be governed by varying the size of the eccentric and the length of the arms of the bell-crank lever.

To increase the flotation of the buoyant particles, I provide air pipes 14 extending longitudinally of the tank at each side of the box and a short distance below the top thereof. These air pipes may be supplied by a feed pipe 15 at the front end of the machine. Just above the box and slightly in front of the corresponding baffles or partitions I mount cross air pipes 16 which may be united to the air pipes 14 by short lengths of rubber hose, one end of each hose being united to a corresponding nipple in the air pipe 14 and the opposite end being united to the end 16b of a cross pipe 16. The hose connections may be united to the air pipes by clamps so as to be readily removable for repairs or replacements.

In the upper side of the air pipes 14 and 16 I form vents, holes or openings preferably about two inches apart and having a diameter approximately one-sixteenth of an inch through which the air may escape from these pipes into the water in the tank and cause a constant upward movement of the air at both sides of and above the box.

To further facilitate the separative action I mount a water pipe 18 extending lengthwise under the middle of the box 12 with ports 18a on each side thereof and with an inlet 20 at the front end of the tank. In order to provide against stoppage of the pipe 18 I provide an outlet 19 at the lower end thereof through the bottom of the tank which may be manually opened by a valve 19a to flush it out.

In order to prevent blocking up of the air ports in the air pipes I mount screens 17 extending lengthwise of these pipes over the pipes and extending inwardly over the edges of the box 12. The elevators and the eccentric shaft may be driven by pulleys and belts or by motors or by any other prime mover.

While my apparatus was designed primarily for use upon placer ground, it may also be used to advantage upon old mine dumps, slime beds, or finely ground material from lodes or veins and while designed originally for the recovery of precious metals, it has also been found useful to recover finely comminuted lead, zinc, and it may be used for any other metals or minerals for which it may be found advantageous.

I find from operation of my machine that it works best when the upper end of the rifflebox or trough is submerged to a depth of from two to six feet with the lower end sloping downwardly preferably at a slope of approximately six inches to the foot, although the slope may be advantageously varied with different grades or kinds of ore or pulp.

I prefer to form the tanks with their greatest depth of not over ten feet and to have the diffleboxes substantially submerged therein—by substantial I mean to indicate a depth of not less than two feet nor more than six feet for the upper end of the rifflebox, but as materials may be found which can be separated more successfully by utilizing a greater depth of submergence of the rifflebox, I do not limit my claims to a maximum depth of six feet.

I prefer to drive the feed and discharge elevators and the vibrating eccentric shaft by belts from a single main shaft, but do not limit my claims to any particular form of driving apparatus.

While I have described the box as having grooves cut in the bottom thereof, it is obvious that the riffles may be formed by nailing strips upon the bottom boards of the box and I use the term "box" or "rifflebox" to cover either a box or trough with grooves cut in the bottom thereof or with riffles formed upon the bottom in any of the other well-known ways.

In Figure 5 I have shown an alternate form of mechanism for adjusting the height of the rifflebox. In this form eyebolts 54 or other suitable means are united to the upper end of the box. A shaft 56 is revolvably mounted in the sides of the tank and extends across the tank above the rifflebox. A cable 55 is partly wound upon the shaft and its ends extend downwardly therefrom and are fastened to the eyebolts 54.

A ratchet 57 may be mounted upon the shaft 56 with a dog 58 pivoted upon the outside of the tank adjacent thereto to retain the ratchet in any desired position of adjustment.

When it is desired to raise the upper end of the rifflebox, the crank 59 may be used to turn the shaft 56 and wind up the cable 55 which will then lift the upper end of the rifflebox and it may be secured in its adjusted position by the ratchet and dog.

While my apparatus will operate effectively with an aqueous pulp and with water in the tank, I do not limit my apparatus to recovery by water alone but when desired, any of the commonly known chemical reagents or pine or other oils may be mixed with the pulp in the feed bin before it is carried upward by the elevator so as to increase the frothing and foaming action or any desired chemicals can be added to the water in the tank for the same purpose. without departing from the spirit of my invention.

The air pipes 14 are preferably mounted upon the sides of the rifflebox 12 and the screens 17 are preferably mounted upon the sides of the rifflebox 12 and the air pipes 14.

In order to permit movement of the air pipes with the rifflebox 12 as it vibrates. I prefer to connect the air feed pipe 16 to the pipes 14 by lengths of rubber hose long enough to permit the upward and downward adjustment of the upper end of the rifflebox 12.

Any desired forms of adjustable intake pipe leading from the hopper 31 to the rifflebox may be used. An opening 60 may be provided in the sleeve 34 through which part of the pulp may pass out into the rifflebox.

The drawings are not to be considered as working drawings drawn to scale, but are enlarged in various parts to be more clearly diagrammatic of the principle of my invention.

In the operation of my apparatus the tank is first filled approximately to the desired water level. The pulp is then fed from a rotary screen or any other desired means into the bin 37. The feed elevator 36 is then set in operation and carries the pulp, which is preferably composed of approximately two parts water and one part earthy matter, to the hopper 31 into which it is pumped and from which it travels by gravity downwardly to the upper end of the box 12. The pulp then travels in a stream confined by the sides of the box and the partitions downwardly along the screen and the finer. subsidable particles settle in the grooves in the bottom boards and are thence carried slowly to the openings 43 and the pocket 48 through which they descend to the bottom of the box where they are carried off by the lower screw conveyor along with any particles which may settle into the trough of